United States Patent [19]

Hurley et al.

[11] Patent Number: 4,745,288

[45] Date of Patent: May 17, 1988

[54] PHOTO RESPONSIVE SELF ADJUSTING REGISTRATION CONTROLLER ACCOUNTING FOR CHANGES IN THE REFLECTIVENESS OF A WEB

[75] Inventors: John Hurley, River Hills; Paul W. Bergland, Brookfield; James D. Parker, New Berlin; Mark G. Blonigen, Mukwonago, all of Wis.

[73] Assignee: Zerand Corporation, New Berlin, Wis.

[21] Appl. No.: 897,257

[22] Filed: Aug. 18, 1986

[51] Int. Cl.⁴ .......................... G01N 21/86; G01V 9/04
[52] U.S. Cl. ..................................... 250/548; 250/557
[58] Field of Search ................. 250/548, 557, 568; 226/45

[56] References Cited

U.S. PATENT DOCUMENTS

| | | | |
|---|---|---|---|
| 2,529,161 | 11/1950 | Kelling et al. | 250/548 |
| 3,424,911 | 1/1969 | Cockrell | 250/548 |
| 3,643,098 | 2/1972 | Willits | 250/548 |
| 3,919,561 | 11/1975 | Coberly | 250/548 |
| 4,243,925 | 1/1981 | Gnuechtel | 250/548 |
| 4,641,070 | 2/1987 | Pfizenmaier et al. | 250/548 |

*Primary Examiner*—David C. Nelms
*Assistant Examiner*—Michael Messinger

*Attorney, Agent, or Firm*—James E. Nilles

[57] ABSTRACT

A registration controller for sensing the presence and location of registration marks on a web as the web passes a scanner, and for generating a signal for use in controlling downstream operations such as cutting and/or printing operations. The controller includes a light source located remotely from the scanner. Light from the source is directed to the scanner and onto the web. The web reflects the light, the amount and intensity of the reflection depending upon the color and reflectivity of the particular area of the web on which the light is being currently directed. The reflected light is directed to a photo receptor which converts the reflected light to an analog electric signal, the level of the signal being determined by the amount and intensity of reflected light, within a particular predetermined range. This analog electric signal is then amplified, processed and converted to a digital signal for use in controlling the aforementioned downstream operations. If the electric signal is greater than a predetermined level, as would be the case if the web surface is a reflective one, such as a foil surface, the processing circuitry clamps the signal and prevents it from exceeding that predetermined level. The preferred means for directing the source light to the scanner and for directing the reflected light to the receptor is fiber optics.

7 Claims, 3 Drawing Sheets

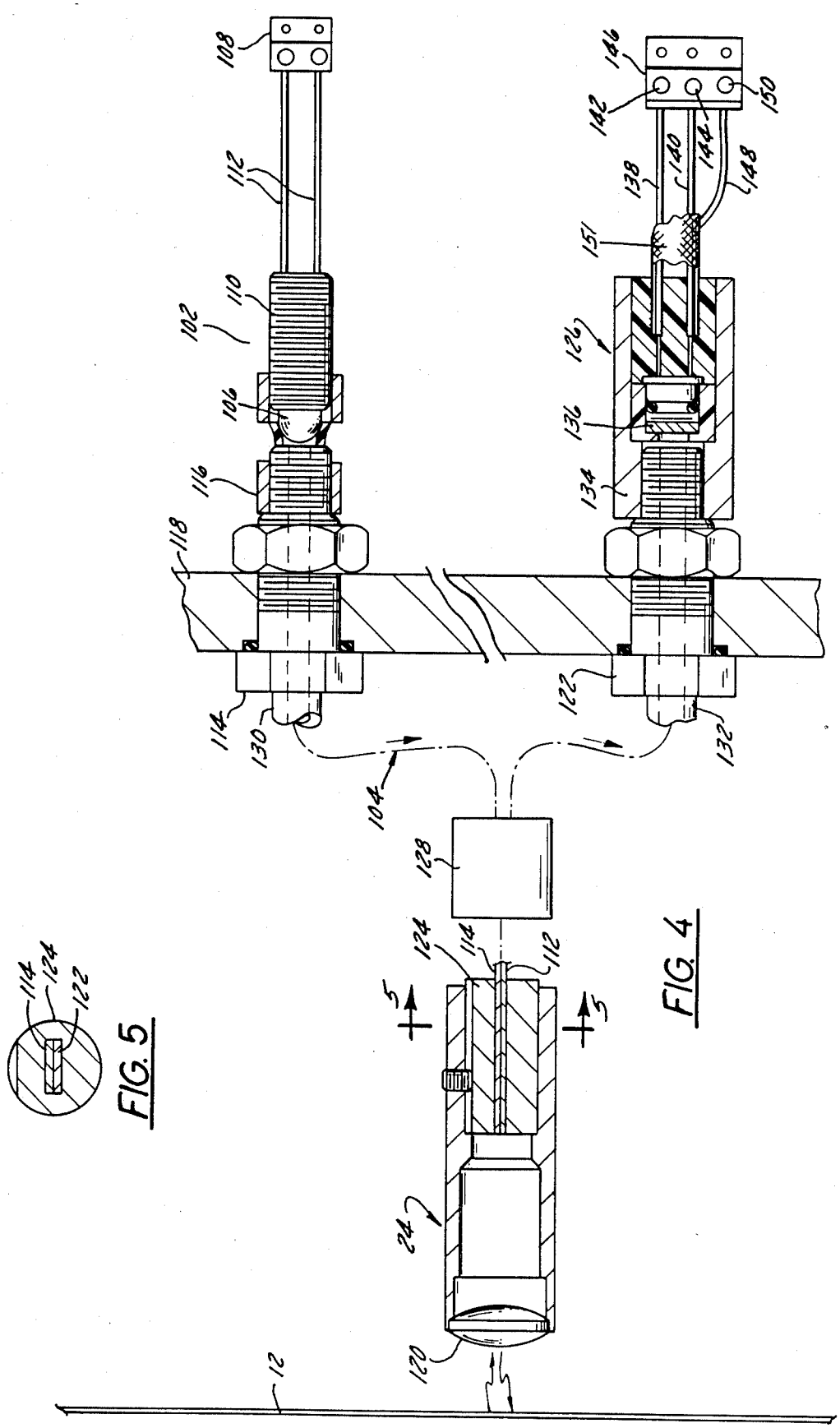

PHOTO RESPONSIVE SELF ADJUSTING REGISTRATION CONTROLLER ACCOUNTING FOR CHANGES IN THE REFLECTIVENESS OF A WEB

BACKGROUND OF THE INVENTION

This invention relates to registration controllers for web processing apparatus, and in particular to such registration controllers which do not have to be readjusted for webs having different reflectivities.

In the past there have been available many different types of photo responsive systems for sensing the registration of certain appropriately placed marks on webs being processed. Generally, however, a change in the type of web required a change in the placement of a scanner with respect to the web. Thus, for instance, a change from plain paper to highly reflective foil required the operator to move the scanner from a position perpendicular to the particular web under inspection to a position at an angle of about 22 degrees thereto. Then, when the foil run was completed and the operator was required to change back to plain paper, the scanner had to be adjusted again, back to the perpendicular position. This scanner adjustment procedure caused substantial down time because of the difficulty caused by the many fine adjustments required.

In addition, such registration systems generally included a light source located at or very near the web itself. Photo responsive registration systems having this characteristic are rated safe for use only in non-explosive environments. A need exists for similar photo responsive registration systems which can be safely used in any environment.

This invention relates to improvements to the apparatus described above and to solutions to some of the problems raised thereby.

SUMMARY OF THE INVENTION

This invention is an improved registration controller for sensing the presence and location of registration marks on a web as the web passes a scanner, and for generating a signal for use in controlling downstream operations such as cutting and/or printing operations. The apparatus of the invention includes a light source located remotely from the scanner. Light from the source is directed to the scanner and onto the web. The web reflects the light, the amount and intensity of the reflection depending upon the color and reflectivity of the particular area of the web on which the light is being currently directed. The reflected light is directed to a photo receptor which converts the reflected light to an analog electric signal, the level of the signal being determined by the amount and intensity of reflected light, within a particular predetermined range. This analog electric signal is then amplified, processed and converted to a digital signal for use in controlling the aforementioned downstream operations. If the electric signal is greater than a predetermined level, as would be the case if the web surface is reflective, such as a foil surface, the processing circuitry clamps the signal and prevents it from exceeding that predetermined level. The preferred means for directing the source light to the scanner and for directing the reflected light to the receptor is fiber optics. This improves the safety of the invention since the light source, whether incandescent or other, is located remotely from the scanner, reducing the risk of explosion in explosive environments.

It is thus an object of the invention to provide a registration controller having means for scanning registration marks by use of reflected light, photo responsive means for converting the reflected light to an analog electric signal, and processing circuitry for amplifying, processing and converting the signal to digital for use in controlling the operation of a web processing apparatus.

Another object of the invention is to provide a registration controller as described above wherein the means for scanning the registration marks employs fiber optics as the light transfer medium.

Other objects and advantages of the invention will become apparent hereinafter.

DESCRIPTION OF THE DRAWINGS

FIG. 4 is a view, partially schematic and partially in section, of the fiber optic arrangement employed in one embodiment of the invention;

FIG. 5 is a cross sectional view of FIG. 4, taken generally along line 5—5;

DESCRIPTION OF THE PREFERRED EMBODIMENTS

Figure 1:
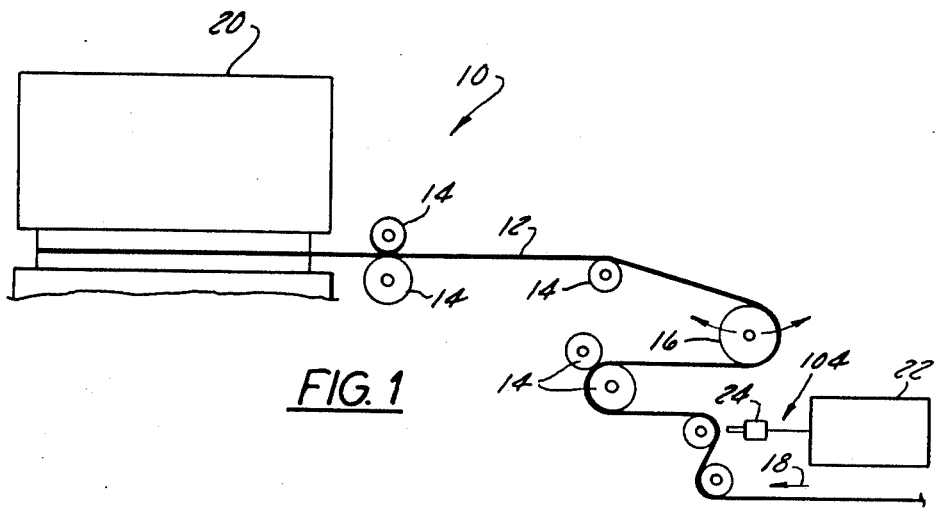
FIG. 1 is a schematic view of a web processing apparatus embodying the present invention.

Referring now to FIG. 1, there is shown a web processing apparatus 10 for processing a continuous web 12 of material. Web processing apparatus 10 is but one example of an apparatus that could employ the registration system which comprises the invention, there being many variations within the scope of the appended claims and the spirit of the invention.

In this embodiment, the apparatus 10 may include various rolls 14 for straightening and aligning the web 12 and dancer roll means 16 for providing proper tension to the web 12, as the web moves in the direction indicated by the arrow 18 from a web source (not shown). After the web 12 passes over the rolls 14 and 16, it continues to a processing station 20, where it is cut or printed as required. Before the web 12 is cut and/or printed, however, the web must be in the correct lengthwise location respective to the processing station 20 so that the cutting or printing takes place at the proper sites lengthwise on the web 12. In order to ensure that this is true, a registration controller 22 is provided for sensing registration marks (not shown) on the web and determining from those marks whether the web 12 is properly located or not. The registration controller 22 has connected thereto a scanner 24, which is located adjacent the web 12 at some suitable point along the path of the web. The controller 22 uses the scanner 24 to sense the existence of the registration marks in a manner to be described presently.

Processing Circuit

Figure 2:
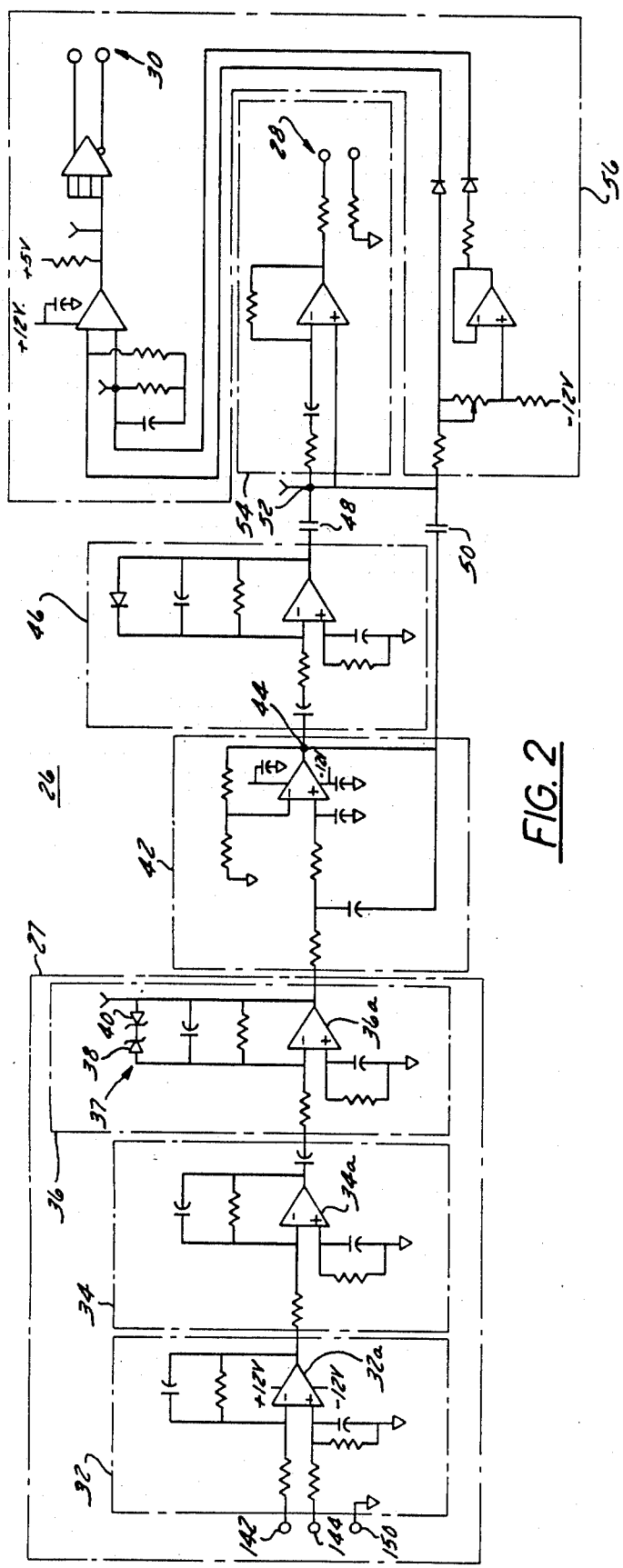
FIG. 2 is a schematic diagram of a processing circuit provided for amplifying, processing and converting the signal from analog to digital, according to the invention.
Figure 3:
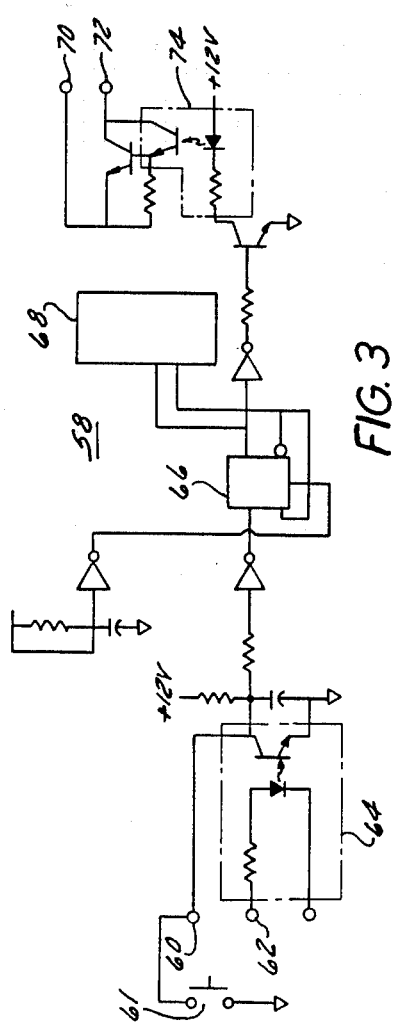
FIG. 3 is a schematic diagram of the control circuit provided for controlling the processing circuit depending upon the background color of the web being registered, according to the invention.

Referring now to FIGS. 2 and 3, the registration controller 22 preferably includes the electrical circuits shown in those figures. FIG. 2 shows a circuit 26 for processing the input from the scanner 24 (FIG. 1), amplifying it and producing an analog output at 28 and a digital output at 30. A plurality of such circuits may be provided if it is desired to receive and process signals from multiple scanners 24. These circuits receive their power from any suitable power supply means (not shown).

The purpose of circuit 26 is to receive an analog signal which is representative of the difference in density between a registration mark and the background of the web 12, and provide an output signal within a predetermined range sufficient for controlling downstream apparatus such as processing station 20. The circuit 26 includes means for determining when that difference in density exceeds a predefined value and for clamping the output signal to maintain it within the predetermined range. In particular, the circuit 26 includes amplifying means 27 for amplifying the input signal to a level effective for machine control. Preferably, amplifying means 27 includes three successive amplifying stages, a first stage 32, a second stage 34 and a third stage 36. Overall these amplifying stages preferably amplify the signal received from the scanners by up to 84,000 times or more, bringing an input signal of no more than a few millivolts to an output signal of up to 15 volts. These amplifying stages generally employ conventional op amps 32a, 34a and 36a and properly matched resistors and capacitors to achieve the intended gain. In the preferred embodiment, the first stage 32 provides a gain of about 1000, the second stage 34 provides a gain of about 8.4 and the third stage provides a gain of about 10 times.

In addition to the signal gain provided by the amplifying means 27, it also includes means 37 for clamping the output signal, generally a voltage, so that a predetermined maximum is not exceeded. The circumstances under which this maximum would be exceeded will be explained subsequently. In the preferred embodiment, the clamping means 37 includes two Zener diodes 38 and 40 placed in series with opposed polarities between the output and the negative input of the op amp 36a of the third amplifying stage 36. These Zener diodes 38 and 40 are chosen and assembled so as to prevent any voltage greater than 5 volts across those two terminals of that op amp 36a.

From the output of the third amplifying stage 36, the signal enters a filter means 42 for filtering out any signals having a frequency greater than a predetermined frequency. This is to prevent the output from responding to web defects and other marks that are clearly too small to be actual registration marks. In the preferred embodiment the predetermined frequency is preferably about 2 kHz.

The signal then is split at a node 44, with one path leading to an inverter circuit 46, and continuing thereafter to first switch means 48. The other path from node 44 leads directly to second switch means 50. Thus by control of the first switch means 48 and the second switch means 50, the signal can be inverted or not, as desired. The advantage of the ability to optionally invert the signal by simple control of switch means 48 and 50 is that the circuit can thus be easily switched from reading dark registration marks on a light web to reading light registration marks on a dark web without resetting or readjusting the scanner 24 with respect to the web 12. The means for controlling the switch means 48 and 50 will be described presently.

The output paths of the switch means 48 and 50 are again connected together at node 52. From there, the signal continues into an analog conditioning circuit 54, to provide analog output 28. This analog output 28 may be used for monitoring devices such as scope screens and the like. Also from node 52, the signal continues into an analog-to-digital conversion circuit 56, to provide digital output 30. This digital output 30 is the output usually used for control of the downstream operations such as cutting and/or printing operations.

Switch Means Control Circuit

FIG. 3 shows a circuit 58 for controlling the switch means 48 and 50, as referred to above. Accordingly, the circuit 58 shown in FIG. 3 in effect controls whether the signal is inverted by passing it through the inverter circuit 46 or not inverted by bypassing the inverter circuit 46.

In particular, circuit 58 includes two possible inputs 60 and 62 for receiving a signal as to whether or not to cause the inversion. The input 60 is connected directly to the circuit, and is intended to be used for a local switch 61 operated most likely by a human operator. The other input 62 is connected to the circuit via isolation means such as a photo coupler 64 as is well known in the art, so that any surges or other noise on the line is not passed on to the rest of the circuit. This input is intended to be connected to a processor means (not shown) which would automatically operate to switch the input and cause the inversion referred to above. From the photo coupler 64 the signal continues to a latch 66, which allows the switch 61 to be a momentary switch, maintaining the circuit in the switched condition after the switch 61 is released and allowed to open. The latch 66 controls a processor 68, which in turn controls the state of the switch means 48 and 50, that is, whether these switch means are open or closed. Terminals 70 and 72, via a photo coupler 74 provided for isolation purposes, provide an output for indicating the state (open or closed) of the switch means 48 and 50.

Hence assuming that switch means 48 are normally open and switch means 50 are normally closed, momentary closing of the switch 61 causes switch means 50 to open and switch means 48 to close, causing the inversion in circuit 26 referred to above. Similarly, once that latter state is the current state and the inversion in circuit 26 is ongoing, momentary closing of the switch 61 causes the switch means 48 and 50 to revert to their respective normal states.

Light Transmission System

As referred to above, the scanner 24, shown best in FIG. 4, is located adjacent the web 12. The scanner 24 is connected in communicating relation with a light source 102 preferably located remote from the scanner 24. Light is generated by the light source 102 and is preferably transmitted to the scanner 24 and returned therefrom via light transmitting means shown schematically at 104. Light transmitting means 104 includes means for transmitting a first beam of light onto the web 12 and onto the registration marks and for transmitting in return a reflected beam of light. In the preferred embodiment, the light source 102 includes a lamp 106, which is preferably a quartz halogen lamp. Lamp 106 receives its power from any suitable power supply (not shown).

As shown in FIG. 4, the light source includes a terminal power strip 108 for connection to the power supply (not shown). The terminal power strip is electrically connected to a lamp socket 110 by a pair of leads 112. In the most preferred embodiment, the light from light source 102 is transmitted by means of fiber optics. Accordingly, the light transmitting means 104 includes an optic fiber means 114, and light source 102 includes generally conventional coupling means 116 for coupling the optic fiber means 114 to the lamp 106 in such a way that the light generated by the lamp 106 is transmitted through the fiber 114. Coupling means 116 may also physically connect the lamp 106 and the fiber optic means 114 to a physical support 118.

As mentioned, the light generated by light source 102 is transmitted to the scanner 24 via fiber optic means 114. At the scanner end of the fiber optic means 114, the light leaves the fiber and passes through a lens 120, which focuses the light on the web 12. The web 12 reflects a certain amount of the light, some of which reflected light reenters the same lens 120. This light is focused by the same lens 120 on a second fiber optic means 122, which is sandwiched together in a single cable 124 with the first fiber optic means 114 in a conventional manner, as shown in cross section in FIG. 5. Second fiber optic means 122 then transmits the reflected light to a receptor means 126. Receptor means 126 is preferably photo responsive and responds to the light transmitted by second fiber optic means 122 by providing an analog electric signal, generally a voltage, representative of the contrast between the intensities of light reflected from the web background and light reflected from a registration mark.

At some point along the path of the second fiber optic means 122 it may be convenient to split it apart from the first fiber optic means 114 by means of a conventional fiber optic splitter means 128, so that the first fiber optic means 114 is carried in one fiber optic cable 130 while the second fiber optic means 122 is carried in a second fiber optic cable 132.

Similar to light source 102, the preferred embodiment of receptor 126 includes generally conventional coupling means 134 for coupling second fiber optic means 122 to a photo responsive cell 136 in such a way that the light transmitted by the second fiber optic means 122 is directed onto the photo responsive cell 136. Coupling means 134 may also physically connect the photo responsive cell 136 and the second fiber optic means 122 to the same physical support 118 or another similar one (not shown). The photo responsive cell 136 is preferably the type of device, such as a photocell, that generates a signal the amplitude of which is directly related to the amount of light incident thereon. The cell is connected via two leads 138 and 140 to terminals 142 and 144 on a terminal strip 146. These two terminals 142 and 144 are shown at FIG. 2 to be the input terminals of processing circuit 26. In addition it will generally be desirable to provide a third lead 148 connecting terminal 150 (also shown in FIG. 2) to the cable overall shield 151 for grounding and shielding purposes.

Operation

In operation, then, the light source 102 sends light to the scanner 24 via first fiber optic means 114. The light is focused on the web 12, which reflects a portion of the light. The reflected light is transmitted to the photo responsive cell 136 via second fiber optic means 132. Photo responsive cell 136 in turn generates a signal based on the amount of the reflected light. The signal from the photo responsive cell 136 is then passed into the processor circuit 26 for amplification and processing. A digital output 30 of the processor circuit 26 is used to control downstream apparatus such as processing station 20 for printing or cutting the web 12. An analog output 28 may also be provided for monitoring purposes. If the web 12 has a light background with dark registration marks, less light will be reflected as the registration marks pass the scanner as compared to when the background is passing the scanner. If the signal level is predefined to be zero for the background, the signal level for the area of the registration marks is at a negative level as shown by the waveform diagram in FIG. 6. That diagram shows the waveform of the digital output 30 of the processing circuit 26 under the conditions described. The areas 152 at the zero level are associated with the background of the web while the lower areas 154 are associated with the registration marks.

Figure 6:
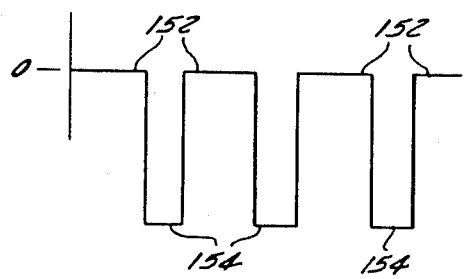
FIG. 6 is a waveform diagram showing the desired waveform pattern for the output of the processor circuit of the invention.
Figure 7:
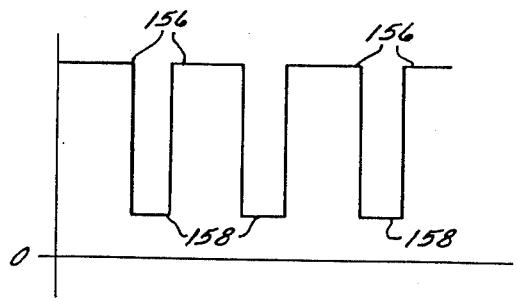
FIGS. 7 and 8 are waveform diagrams showing what the output would be under certain web conditions without the adjustments provided by the invention.

If the background of the web 12 is reflective, such as foil, the amplitude of the background portion of the signal would be too great for prior art registration controllers to function properly without relocation of the scanner to reduce the level of the signal. In the present invention, however, the signal is clamped at a suitable level by clamping means 37. This is illustrated by comparison of FIG. 7 to FIG. 6. FIG. 7 is a waveform diagram of what the digital output 30 would be were it not for the clamping means 37 of processing circuit 26. As shown there, the background level 156 is very high, so high that the areas 158 associated with the registration marks do not cross the zero line and the controller would not function. Since the downstream apparatus to be controlled generally responds only to a negative value, the apparatus will not respond to an output with this waveform. With the clamping means 37 included in the processor circuit 26, however, the waveform is again as shown in FIG. 6 and the system functions properly.

Figure 8:
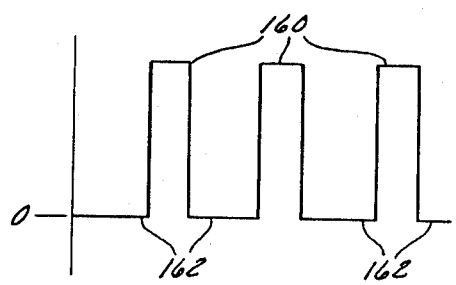

If the web 12 has a relatively dark background with light registration marks, the digital output 30 would normally appear as shown in FIG. 8, with the areas 160 associated with the registration marks being higher than those areas 162 associated with the background. Since, as referred to above, the downstream apparatus generally responds only to a negative value, the output 30 must be inverted so that the output follows the waveform shown in FIG. 6. To accomplish this inversion, a switch 61 is closed which in effect inverts the outputs 28 and 30 of the processing circuit 26 so that the circuit functions to determine the existence and location of the registration marks, again without reorientation of the scanner 24 with respect to the web 12.

While the apparatus hereinbefore described is effectively adapted to fulfill the aforesaid objects, it is to be understood that the invention is not intended to be limited to the particular preferred embodiments of photo responsive self adjusting registration controller herein set forth. Rather, it is to be taken as including all reasonable equivalents without departing from the scope of the appended claims.

We claim:

1. In a registration controller for web processing apparatus wherein a moving reflective web has registration marks thereon:
   means for scanning said registration marks comprising means for transmitting a first beam of light onto said web and onto said registration marks and for transmitting in return a reflected beam of light, the intensity of said reflected beam being determined by the reflectiveness of said web;
   photo responsive means for responding to said reflected beam of light and for providing a web analog electric signal representative of the intensity of said reflected beam when said transmitted beam is directed at a non-mark portion of the web and a mark analog electric signal representative of the intensity of said reflected beam when said transmitted beam is directed at a mark;
   electronic means for amplifying said analog electric signals into a high gain analog signals,
   means for limiting said high gain signals so that the difference between them does not exceed a predetermined maximum,
   means for filtering said limited signals to remove background noise therefrom,
   and means for converting said filtered signals into digital output signals
   such that said digital output signals are usable to control operation of said web processing apparatus regardless of any change in the reflectiveness of said web.

2. A controller according to claim 1 wherein said means for transmitting light comprises fiber optics.

3. A controller according to claim 1 wherein said web may have either a dark background with relatively lighter registration marks thereon or a light background with relatively darker registration marks thereon,
   and further comprising means for inverting said filtered signals prior to converting them to digital output signals.

4. A registration controller for web processing apparatus, wherein a web having register marks thereon is moved, comprising:
   a photo responsive device for receiving a light beam reflected from a web surface and from a register mark on said surface and for providing an analog signal at a web level representing said web surface and an analog signal at a mark level representing said mark;
   electronic circuit means for receiving said analog signals, and providing an output signal based on said analog signal changing from one of said levels to the other of said levels and having a predetermined difference between said two levels sufficient to effect control of said apparatus, and
   means for determining when said analog signal at said web level exceeds a predefined value, and for limiting said analog signal when said web level signal exceeds said predefined value, such that said circuit provides an output signal which is effective to control said apparatus regardless of any change in reflectiveness of the web.

5. A controller according to claim 4 wherein said light beam is transmitted to said web surface and from said web surface to said photo responsive device by means of fiber optics.

6. A controller according to claim 4 wherein said electronic circuit includes means for amplifying said analog signals into high gain analog signals, for filtering said high gain analog signals to remove background noise therefrom, and for converting said filtered high gain analog signals into digital output signals usable to control operation of said web processing apparatus.

7. A controller according to claim 6 wherein said web has a dark background with relatively lighter registration marks thereon,
   and further comprising means for inverting said output signals prior to converting them to digital output signals.

* * * * *